United States Patent
Furukawa et al.

(10) Patent No.: US 10,721,063 B2
(45) Date of Patent: Jul. 21, 2020

(54) SECURE COMPUTATION DATA UTILIZATION SYSTEM, METHOD, APPARATUS AND NON-TRANSITORY MEDIUM

(71) Applicant: NEC CORPORATION, Tokyo (JP)

(72) Inventors: Jun Furukawa, Tokyo (JP); Kengo Mori, Tokyo (JP); Isamu Teranishi, Tokyo (JP); Toshinori Araki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 316 days.

(21) Appl. No.: 15/571,880

(22) PCT Filed: May 7, 2015

(86) PCT No.: PCT/JP2015/063226
§ 371 (c)(1),
(2) Date: Nov. 6, 2017

(87) PCT Pub. No.: WO2016/178291
PCT Pub. Date: Nov. 10, 2016

(65) Prior Publication Data
US 2018/0139045 A1    May 17, 2018

(51) Int. Cl.
*H04L 9/08* (2006.01)
*G06F 16/25* (2019.01)
(Continued)

(52) U.S. Cl.
CPC .......... *H04L 9/0861* (2013.01); *G06F 16/258* (2019.01); *G06F 21/6218* (2013.01);
(Continued)

(58) Field of Classification Search
CPC ........ G06F 21/57; G06F 12/14; G06F 16/258; G06F 21/6218; G06F 21/6227;
(Continued)

(56) References Cited

U.S. PATENT DOCUMENTS 7,421,080 B2 * 9/2008 Matsumura ............. H04L 9/085
380/277
8,812,877 B2   8/2014 Mori et al.
(Continued)

FOREIGN PATENT DOCUMENTS

| JP | 2012-033089 A | 2/2012 |
| JP | 5344109 B1 | 8/2013 |
| WO | 2016056473 A1 | 4/2016 |

OTHER PUBLICATIONS

Communication dated Jun. 5, 2018, from the Japanese Patent Office in counterpart application No. 2017-516545.
(Continued)

*Primary Examiner* — Thanhnga B Truong
(74) *Attorney, Agent, or Firm* — Sughrue Mion, PLLC (57) ABSTRACT

An intermediate apparatus that upon reception of a request from an application apparatus, instructs a plurality of secure computation apparatuses to perform a secret computation processing, in accordance with the request, performs a part of operation of the request from the application apparatus, on at least one of a part of data included in the request or data reconstructed from shares received from a plurality of secure computation apparatuses.

18 Claims, 4 Drawing Sheets

(51) Int. Cl.
*H04L 29/06* (2006.01)
*G06F 21/62* (2013.01)
*G09C 1/00* (2006.01)

(52) U.S. Cl.
CPC ............ *G06F 21/6227* (2013.01); *G09C 1/00* (2013.01); *H04L 9/085* (2013.01); *H04L 63/0485* (2013.01); *H04L 63/06* (2013.01); *H04L 2209/46* (2013.01)

(58) Field of Classification Search
CPC ......... H04L 29/06; H04L 9/00; H04L 9/0861; H04L 9/085; H04L 63/0485; H04L 63/06; G09C 1/00
See application file for complete search history.

(56) References Cited

U.S. PATENT DOCUMENTS

| | | | |
|---|---|---|---|
| 2012/0002811 A1* | 1/2012 | Smart | H04L 9/085 380/255 |
| 2013/0246813 A1 | 9/2013 | Mori et al. | |
| 2015/0006908 A1 | 1/2015 | Mori et al. | |
| 2015/0074764 A1* | 3/2015 | Stern | H04L 63/06 726/4 |
| 2017/0310473 A1 | 10/2017 | Takiguchi et al. | |

OTHER PUBLICATIONS

Adi Shamir, "How to Share a Secret", Communications of the ACM, Nov. 1979, pp. 612-613, vol. 22, No. 11.

Doi Hiroshi, "Secret Sharing Method and its Application", Information Security Comprehensive Science, Nov. 2012, pp. 137-149, vol. 4.

Shimura Masanori, et al., "Relational Algebra in Multi-party Protocol to Enable Structural Operation in Secret Shared Databases", Transactions of Information Processing Society, Sep. 2010, pp. 1563-1578, vol. 51, No. 9.

Koji Chida et al., "Big Data Katsuyo e Kagi o Nigiru Himitsu Keisan", Nikkei Electronics, Jun. 23, 2014, pp. 47-54, No. 1137.

International Search Report for PCT/JP2015/063226 dated Aug. 4, 2015 [PCT/ISA/210].

\* cited by examiner

SECURE COMPUTATION DATA UTILIZATION SYSTEM, METHOD, APPARATUS AND NON-TRANSITORY MEDIUM

CROSS REFERENCE TO RELATED APPLICATIONS

This application is a National Stage of International Application No. PCT/JP2015/063226, filed on May 7, 2015, the contents of all of which are incorporated herein by reference in their entirety.

FIELD

The present invention relates to a secure computation data utilization system, method, apparatus and non-transitory medium.

BACKGROUND

The related art will be described below.

Figure 1:
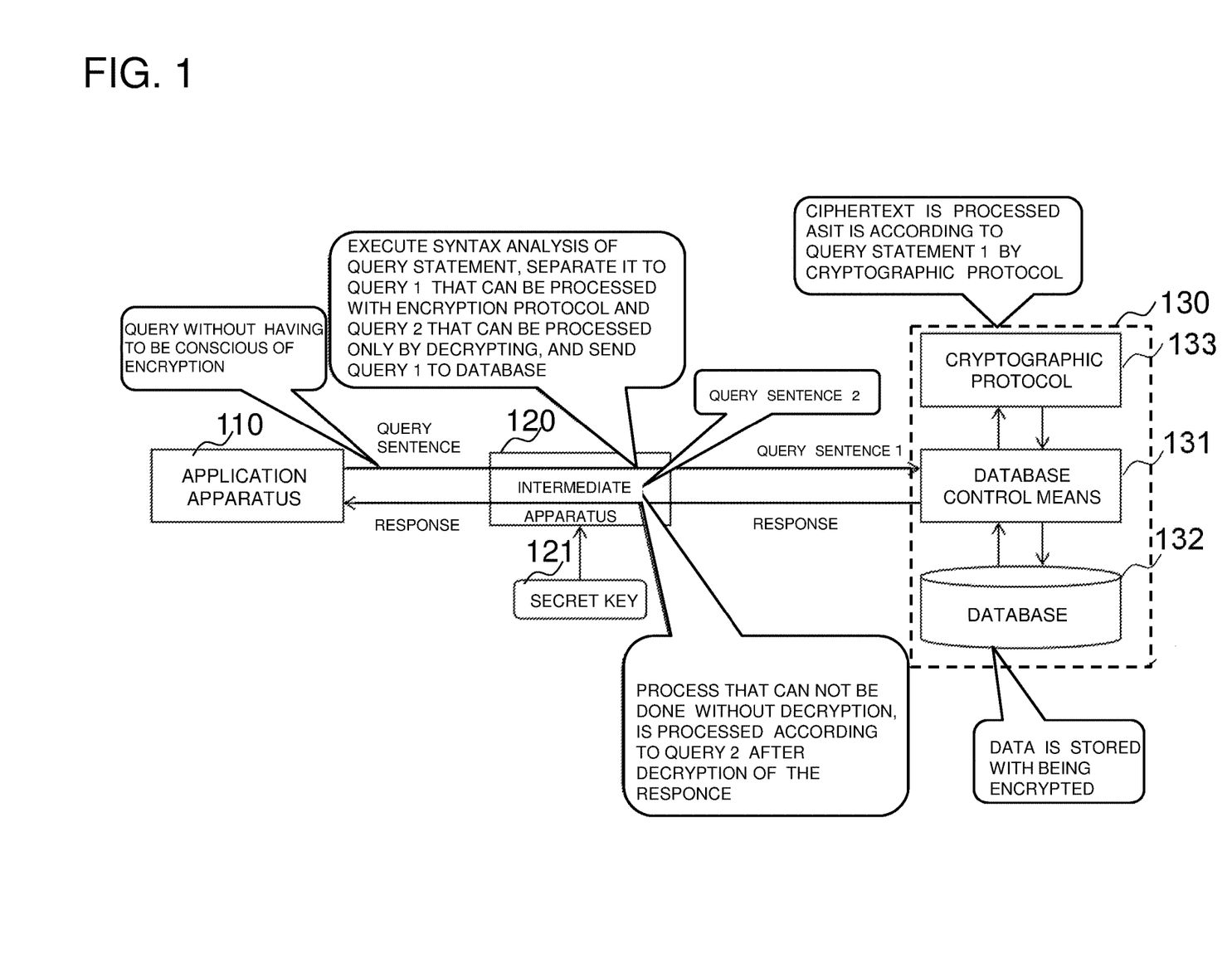
FIG. 1 is a diagram for explaining a related art (Patent Literature 1).

Inventors including part of the present inventors have already proposed a database system to cope with information leakage (see, for example, Patent Literature 1). FIG. 1 is an explanatory diagram newly created by the present inventors in order to exemplify an outline of one aspect of the disclosure of Patent Literature 1. The following describes the outline. Note that in FIG. 1, names and reference numerals of constituent elements are not the same as those in the drawings of Patent Literature 1.

An application apparatus 110 on which an application software (program) runs issues a request to perform a certain process on data stored (stored with being encrypted) in a database system 130 and send back to the application apparatus 110. An intermediate apparatus (corresponds to a user system in Patent Literature 1) 120 changes this request adapted to a method for applying a cryptographic protocol in the database and an application result of the method (query sentence 1) and sends the query sentence 1 to the database system 130. The result of this request is, for example, a ciphertext. There are cases in which simple decryption of the ciphertext does not provide processed data requested by the application apparatus 110.

In response to the request from the intermediate apparatus 120, the database control means 131 processes the data in ciphertext by using the encryption protocol 133 and sends the processed result to the intermediate apparatus 120. The intermediate apparatus 120 decrypts received data, applies further processing (corresponding to a query sentence 2) as necessary, and then sends the data to the application apparatus 110.

Since a cyphertext is processed using the cryptographic protocol 133 in the database system 130, the ciphertext of data requested by the application apparatus 110 cannot always be generated promptly. Further, there are sometimes such cases wherein the database control means 131 can reduce data amount (transfer amount) to be returned to the intermediate apparatus 120, by filtering data in ciphertext as it is or by calculating statistical values in ciphertext as it is. Furthermore, when the intermediate apparatus 120 is adapted to process a plaintext obtained by decrypting the encrypted data using a secret key 121, the intermediate apparatus 120 can perform such data processing that could not be performed on data in ciphertext as it is. As a result, data desired by the application apparatus 110 can be sent to the application apparatus 110.

With such a technique, when the application apparatus 110 issues a request for data to the database system 130, as though the data is not encrypted, the database system 130 can deliver desired data to the application apparatus 110, even when the data that has been encrypted is stored and the database 130 has not an encryption key. In addition, the amount of data transferred from the database system 130 to the intermediate apparatus 120 can be reduced as compared with a case of passing all ciphertexts related to the request.

Secret sharing schemes are widely known as information security technologies (reference may be made to Non-Patent Literatures 1 and 2). For example, it is possible to implement a system that distributes information to a plurality of databases or memory systems by using secret sharing scheme to reduce possibility of occurrence of loss of original information, due to possibility of information leakage and data corruption etc.

A (k, n) threshold secret sharing scheme by polynomial interpolation includes the following distribution and reconstruction processing (reference may be done to Non-Patent Literatures 1 and 2, etc.).

<Distribution>

A random k−1 order polynomial with a secret s as a constant term $a_0$ $$F(x) = a_0 + a_1 \cdot x + a_2 \cdot x^{\wedge}(k-1)$$

($a_1$ to $a_{k-1}$ are integers, ^ is a power operator). An owner of the secret s sends F(i) as a share Wi to a share holder (apparatus) with an identifier i. It is assumed that identifiers 1 to n are allocated to n share holders.

<Reconstruction>

The secret s (=$a_0$) can be obtained by collecting (i, Wi) of k share holders.

When realizing the (k, n) threshold scheme on finite prime field Z/qZ with q as a prime, the coefficients $a_0$ to $a_{k-1}$ of the polynomial are also an element on Z/qZ and addition, subtraction, and multiplication, are performed on Z/qZ. The secret s (=F(0)) is also an element on Z/qZ. The share of the share holder i is F(i) mod q. The secret s (=F(0) mod q), obtained by selecting a set S={$i_1, \ldots, i_k$} ⊂ {1, 2, \ldots, n}, using Lagrangian interpolation. F(0) is given by:

$$F(0) = \sum_{i_l \in S} F(i_l) \lambda_{i_l, S}(0) \bmod q$$
$$= \sum_{i_l \in S} F(i_l) \prod_{i_j \in S \setminus i_l} \frac{-i_j}{i_l - i_j} \bmod q$$

In realizing the (k, n) threshold secret sharing scheme on the finite prime field Z/qZ, even if k−1 shares are collected, information on secret s cannot be obtained at all.

There is known a (K, L, n) threshold ramp type secret sharing scheme using three parameter that allows some information of secret s to be obtained from 1 share (k−L+1≤l≤k−1), but it is possible to obtain information of the secret s from k shares (k is a threshold) and information on the secret s cannot be obtained at all from k−L shares (for example, reference may be made to Non-Patent Literature 2).

That data A is secrete-shared means that each of a plurality of shares obtained by secret sharing of the data A is held in each of the apparatus sets.

In a secure multiparty computation, secret-shares of data are sent to a plurality of apparatuses which repeatedly perform partial calculation of secret shares, so that various calculations can be performed with the data being kept concealed.

For example, in the multi-party protocol, each apparatus i (i=1 to n) distributes shares $w^1{}_i, \ldots, w^i{}_i, \ldots, w^n{}_i$ obtained by secret sharing of the secret si of the apparatus to each apparatus. Each apparatus i (i=1 to n) holds the shares $w^i{}_1, \ldots, w^i{}_{i-1}, w^i{}_{i+1}, \ldots, w^i{}_n$ distributed to the apparatus i from other apparatuses j (j=1 to n, where j≠i) in addition to the share wi and calculates the function h ($w^1{}_1, w^2{}_1, \ldots, w^1{}_i, w^2{}_i, \ldots, w^n{}_n$)=($v^1, \ldots, v^i, \ldots, v^n$), where $v^1, \ldots, v^i, \ldots v^n$ are shares of function values v=g ($s_1, s_2, \ldots, s_n$) of the secret information $s_1, s_2, \ldots, s_n$ (see Non-Non-Patent Literature 3). Non-Non-Patent Literature 3 proposes an arrangement that enables execution of relational algebra operations using multi-party protocols and enables all structural operations without decrypting data on a database distributed by a secret sharing scheme.

To generate secret shared data B by performing secure computation on secret shared data A, means that the secure computation starts from a state where the data A is secret shared and ends with a state wherein the data B is secret shared. In the multi-party protocol, each participant has secret information, and a function of the secret information is calculated with the secret information kept concealed.

As mentioned above, when certain data is secret-shared, the original data can be reconstructed by collecting a certain number of shares. Or, even if the same share as the share that can be obtained by secret sharing of certain data is generated in some way, it is possible to reconstruct the corresponding data by collecting a certain number of these shares.

Patent Literature 1

Japanese Patent No. 5344109

Non-Patent Literature 1

Shamir, Adi (1979), "How to share a secret", Communications of the ACM 22 (11): 612-613

NON-PATENT LITERATURE 2

Doi Hiroshi, Secret sharing method and its application, Information Security Comprehensive Science, Vol. 4, November 2012

NON-PATENT LITERATURE 3

Shimura Masanori, Miyazaki Kunihiko, Nishide Takashi, Yoshiura Hiroshi, Relational Algebra in Multi-party Protocol to Enable Structural Operation in Secret Shared Databases, Transactions of Information Processing Society, Vol. 51, No. 9, pp. 1563-1578, 2010

SUMMARY

The analysis of related technologies is given below.

When attempting to integrate a database system and a secret computing system, a computation amount in the secret computing process is large, and its practical application is not easy.

The present invention has been made in view of the above problems, and an object of the present invention is to provide a system, a method, an apparatus, and a non-transitory medium storing a program, each of which can suppress or reduce an increase in a computation amount, and a transfer information amount when integrating a database system and a secret computing system.

According to one aspect of the present invention, there is provided an information processing apparatus comprising:

an application apparatus on which an application runs;

a plurality of secure computation apparatuses; and an intermediate apparatus that upon reception of a request from the application apparatus, instructs the plurality of secure computation apparatuses to perform operation in accordance with the request, wherein each of the secure computation apparatuses comprises a unit that transmits, to the intermediate apparatus, a share of a result of processing the operation by secure computation on a share obtained by secrete sharing of data, the operation being instructed from the intermediate apparatus, and wherein the intermediate apparatus comprises a unit that reconstructs data from the plurality of shares transmitted from the plurality of secure computation apparatuses; and a unit that performs a part of the operation indicated by the request from the application apparatus, on the reconstructed data, or the reconstructed data and at least a part of data included in the According to another aspect of the present invention, there is provided a method comprising:

an intermediate apparatus, upon reception of a request from an application apparatus on which an application runs, instructing a plurality of secure computation apparatuses to perform operation in accordance with the request, the plurality of the secure computation apparatuses each processing the operation by secure computation on shares obtained by secrete sharing of data, the operation being instructed from the intermediate apparatus to transmit, to the intermediate apparatus, shares of results of processing the operation by secure computation;

the intermediate apparatus reconstructing data from a plurality of the shares received from the plurality of secure computation apparatuses; and the intermediate apparatus performing a part of the operation indicated by the request from the application apparatus, on the reconstructed data, or the reconstructed data and at least a part of data included in the request.

According to still another aspect of the present invention, there is provided an intermediate apparatus arranged between an application apparatus on which an application runs, and a plurality of secure computation apparatuses that process operation instructed from the intermediate apparatus by secure computation on shares obtained by secrete sharing of data to transmit, to the intermediate apparatus, shares of results of processing the operation by secure computation, the intermediate apparatus comprising:

a first unit that receives a request from the application apparatus to instruct the plurality of secure computation apparatuses to perform operation in accordance with the request;

a second unit that reconstructs data from the plurality of shares transmitted from the plurality of secure computation apparatuses; and a third unit that performs a part of the operation indicated by the request from the application apparatus, on the reconstructed data, or the reconstructed data and at least a part of data included in the request.

According to still another aspect of the present invention, there is provided a non-transitory computer readable recording medium storing therein a program causing a computer constituting an intermediate apparatus arranged between an application apparatus on which an application runs, and a plurality of secure computation apparatuses that process operation instructed from the intermediate apparatus by secure computation on shares obtained by secrete sharing of data to transmit, to the intermediate apparatus, shares of results of processing the operation by secure computation, to execute processing comprising:

receiving a request from the application apparatus to instruct the plurality of secure computation apparatuses to perform operation in accordance with the request;

reconstructing data from the plurality of shares transmitted from the plurality of secure computation apparatuses; and performing a part of the operation indicated by the request from the application apparatus, on the reconstructed data, or the reconstructed data and at least a part of data included in the request. The non-transitory computer readable recording medium may be such as a semiconductor memory or a magnetic/optical recording medium.

According to still another aspect of the present invention, there is provided a secure computation apparatus connected to an intermediate apparatus that upon reception of a request from an application apparatus on which an application runs, instructs a plurality of secure computation apparatuses to perform secure computation processing in accordance with the request, the secure computation apparatus comprising:

a unit that receives a part of operation of the request indicated by the intermediate apparatus;

a unit that performs secure computation for the part of the operation, using shared held among the plurality of secure computation apparatuses; and a unit that returns, to the intermediate apparatus, a share which is a result of the secure computation, wherein the intermediate apparatus is set to execute remaining operation out of the operation of the request on data reconstructed from the shares.

According to still another aspect of the present invention, there is provided a non-transitory computer readable recording medium storing therein a program causing a computer constituting a secure computation apparatus connected to an intermediate apparatus that upon reception of a request from an application apparatus on which an application runs, instructs a plurality of secure computation apparatuses to perform secure computation processing in accordance with the request, to execute processing comprising:

receiving a part of operation of the request indicated by the intermediate apparatus;

performing secure computation for the part of the operation, using shared held among the plurality of secure computation apparatuses; and returning, to the intermediate apparatus, a share which is a result of the secure computation.

According to the present invention, it is possible to suppress or reduce an increase in a computation amount, a communication amount and a transfer information amount when a database and a secure computation system are integrated.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

A related invention which is a premise of the present invention will be described. Let consider a system wherein the database system of FIG. 1 are composed by a plurality of secure computation apparatuses, wherein data to be stored in the database is secret-shared and held in a plurality of secure computation apparatuses, and wherein a query to the database system from the application apparatus 110 is issued to the intermediate apparatus. In this case, the intermediate apparatus 120 of FIG. 1 performs processing of secretly distributing to a plurality of secure computation apparatuses, shares generated by distributing data, and processing of collecting the shares of the calculation results secretly computed by the plurality of secure computation apparatuses and reconstructing the data.

Upon reception of a request to the database from the application apparatus, the intermediate apparatus issues a request to a set of the secure computation apparatuses to perform secure computation of the secret shares of data that is processed according to the request, from the data (shares) that are secret shared in the set of secure computation apparatuses. For example, assuming that each secure computation apparatus is given shares of a plurality of secret information SA and SB, and the shares of the secret information SA and SB held by the jth secure computation apparatus are denoted as SA, j, SB, j, SA, j+SB, j mod q (q is a prime number) is the share of SA+SB mod q. Therefore, it is possible to calculate a secret information function f (SA, SB) (f is, for example, addition operation) with the secret information kept secret (without reconstructing secret information).

The intermediate apparatus requests the intermediate apparatus to return the shares which are secure computation results by the set of secure computation apparatuses and which are distributed and held in the set of secure computation apparatuses.

The intermediate apparatus reconstructs the data requested by the application apparatus from a plurality of shares obtained from the set of secure computation apparatuses and sends the reconstructed data to the application apparatus.

In the above described system of the related invention, the database is constituted by a plurality of secure computation apparatuses. An administrator of each secure computation apparatus cannot obtain information on what is data that is held in the database and returned to the application in response to the request. This means that the secure computation apparatus cannot leak data.

However, in the above system, processing of the requested data can be executed in a secret sharing scheme, but the processing content may greatly affect performance.

For example, when derivation of values based on
conversion of data format,
sorting of order of data, and
result of the sorting.
division of a real number in an average value calculation, and so forth are to be secretly calculated among a plurality of the secure computation apparatuses, the amount of computation is large. For this reason, practical application is difficult.

Modes disclosed below, can improve calculation efficiency and make practical application possible.

Example Embodiments

Figure 2:
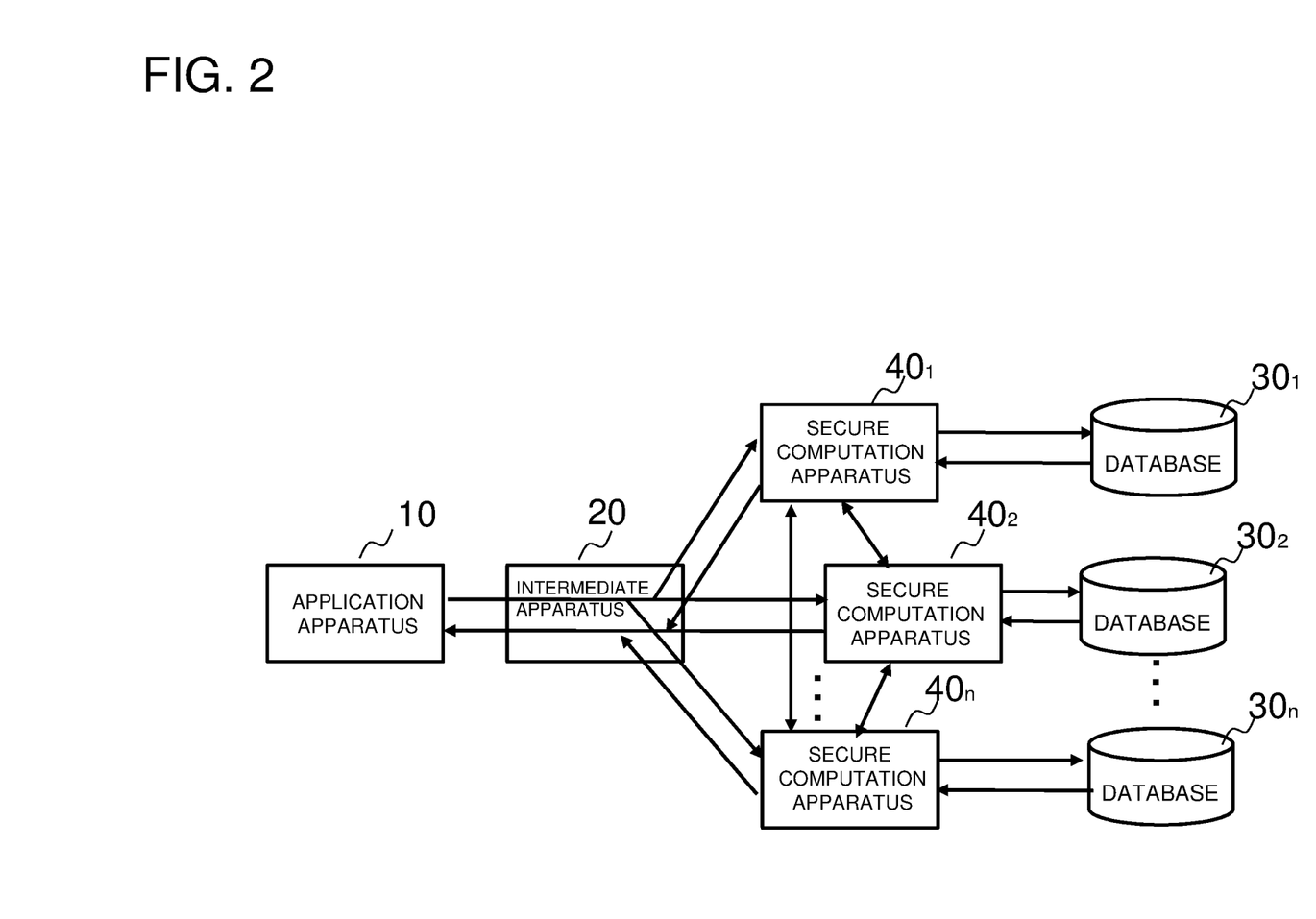
FIG. 2 is a diagram illustrating an example embodiment of the present invention.

FIG. 2 is a diagram illustrating an example embodiment of the present invention. Referring to FIG. 2, the system includes, for example, an application apparatus 10 on which an application software that issues an access request to a database runs, and a plurality of secure computation apparatuses $40_1$ to $40_1$ that store secret shared data (shares) in the databases $30_1$ to $30_n$, respectively, and an intermediate apparatus 20 arranged between the application apparatus 10 and secure computation apparatuses $40_1$ to $40_n$.

Although not particularly limited, the shares obtained by dividing the data into n pieces are stored in the databases $30_1$ to $30_n$. The data structures such as column names of columns and rows of the databases $30_1$ to $30_n$ are the same.

A database access request (command) from the application apparatus 10 is transmitted to the secure computation apparatuses $40_1$ to $40_n$ via the intermediate apparatus 20.

Responses from the secure computation apparatuses $40_1$ to $40_n$ are returned to the application apparatus 10 via the intermediate apparatus 20.

Upon reception of a request from the application apparatus 10, the intermediate apparatus 20 performs, for example, the following processing:
  when there is processing (operation) that can be executed using only data included in the request, the intermediate apparatus 20 performs the processing (operation).
  the intermediate apparatus 20 performs secret sharing of data necessary for processing (secure computation) by the secure computation apparatuses $40_1$ to $40_n$, and delivers the corresponding shares to the secure computation apparatuses $40_1$ to $40_n$, respectively. In addition to this, the intermediate apparatus 20 issues an instruction of processing (operation) to the secure computation apparatuses $40_1$ to $40_n$. At this time, part of the data may also be stored in the intermediate apparatus 20.

The secure computation apparatuses $40_1$ to $40_n$, upon reception of the instruction of processing (operation) and the shares from the intermediate apparatus 20, generate securely computed shares using data secret-shared in the databases $30_1$ to $30_n$ and the shares. In the case of the (k, n) threshold secret sharing scheme, k (k<n) secure computation apparatuses among the n secure computation apparatuses $40_1$ to $40_n$ send the shares of the result of secure computation to the intermediate apparatus 20.

It is noted that in the secret sharing scheme of the (n, n) system, since all shares are necessary to reconstruct original information, the share of the secure computation result of the n secure computation apparatuses $40_1$ to $40_n$ are sent to the intermediate apparatus 20. Hereinafter, at least k secure computation apparatuses out of the n secure computation apparatuses $40_1$ to $40_n$ (where k≤n) are also referred to as a set of secure computation apparatuses 40, for the sake of simplicity.

The intermediate apparatus 20 reconstructs the result (data) securely computed by the set of secure computation apparatuses 40 from the shares transmitted from the set of secure computation apparatuses 40.

The intermediate apparatus 20 performs a necessary operation using the reconstructed data to generate data requested by the application apparatus 10. The operation performed on the reconstructed data by the intermediate apparatus 20 is a part of the operation included in the request from the application apparatus 10. The intermediate apparatus 20 does not perform secure computation performed by the secure computation apparatuses $40_1$ to $40_n$. The operation performed on the reconstructed data by the intermediate apparatus 20 corresponds to the partial operation that the intermediate apparatus 20 judges to perform on the reconstructed data and separates from the operation of the request. In this partial operation, the intermediate apparatus 20 may perform the calculation using the reconstructed data and the data stored in the intermediate apparatus 20.

The intermediate apparatus 20 sends the generated data to the application apparatus 10 as a response to the request from the application apparatus 10.

According to the example embodiment, the intermediate apparatus 20 executes a portion of the data processing of the request (which may include data) received from the application apparatus 10.

When the operation included in the request from the application apparatus 10 includes an operation that is difficult to perform secure computation by the secure computation apparatuses $40_1$ to $40_n$, includes at least one of the followings, for example,
  (A) replacing the order;
  (B) conversion of data format (including replacement of data items according to values of data items);
  (C) average value calculation (processing to divide the total by the total number);
  (D) ordering; and
  (E) concatenation of character strings, and so forth, the operation is separated, and is performed on the intermediate apparatus 20 side instead of performing secure computation processing by the secure computation apparatuses 401 to 40n. It is a matter of course that the operations which are not good at secure computation by the secure computation apparatuses 401 to 40n are not limited to the above listed operations.

In FIG. 2, it is a matter of course that the databases $30_1$ to $30_n$ connected to the secure computation apparatuses $40_1$ to $40_n$ may be mounted on one storage apparatus. In this case, for example, the storage apparatus may be partitioned and the databases $30_1$ to $30_n$ may are respectively installed in the n partitions so that the database corresponding to one secure computation apparatus is security-managed so as not to be accessible from others.

<Intermediate Apparatus>

Figure 3:
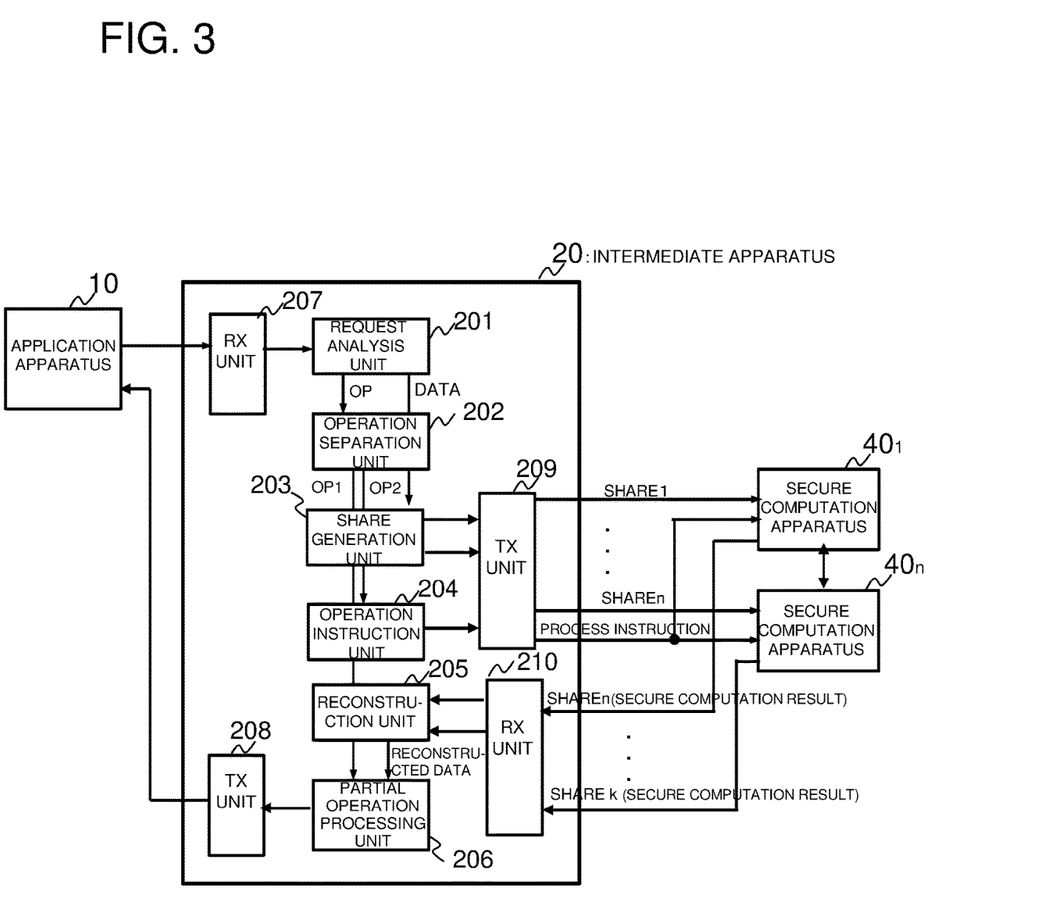
FIG. 3 is a diagram illustrating an intermediate apparatus of an example embodiment of the present invention.

FIG. 3 is a diagram for illustrating an example of the intermediate apparatus 20 in the above-described example embodiment. Although not particularly limited thereto, the (k, n) threshold secret sharing scheme is used in the following.

Referring to FIG. 3, the intermediate apparatus 20 includes a request analysis unit 201, an operation separation unit 202, a share generation unit 203, an operation instruction unit 204, a reconstruction unit 205, a partial operation processing unit 206, a reception unit 207 that receives a request (command) from the application apparatus 10, a transmission unit 208 that transmits a response to a request (command) to the application apparatus 10, a transmission unit 209 that transmits shares 1 to n to the secure computation apparatuses $40_1$ to $40n$, a reception unit 210 that receives at least k shares 1 to k (where k<n) among the shares 1 to n securely-computed by the secure computation apparatuses $40_1$ to $40n$.

The request analyzing unit 201 analyzes a request (command) from the application apparatus 10 that is received by the reception unit 207, extracts and separates an operation (function) and data from the command, and sends an operation (function) to the operation separation unit 202, which supplies the data that is secret-shared and sent to the secure computation apparatuses $40_1$ to $40_n$ to the share generating unit 203. As a result of the analysis of the command by the request analysis unit 201, data to be processed by the intermediate apparatus 20 is held in the intermediate apparatus 20.

In the operation separation unit 202, when the operation included in the command supplied from the request analyzing unit 201 is, for example, a composite operation, separates the composite operation into an operation 1 (function 1) in which secure computation by the secure computation apparatuses $40_1$ to $40_n$ is not good (for example, the above (A) to (E), etc.) and an operation 2 (function 2) in which secure computation by the secure computation apparatuses $40_1$ to $40n$ is comparatively easy, such as sum operation, for example. In FIG. 3, only for the sake of simplicity of explanation, an example in which the operation included in the request is divided into the operation 1 and the calculation 2 has been described, but it is as a matter of course that the number of operations to be separated is not limited to two.

In the case where a request (command) from the application apparatus 10 is to store a secret-shared share of data from the application apparatus 10 in the databases $30_1$ to $30_n$ (i.e., when it is not a composite operation), the secure computation apparatuses $40_1$ to $40_n$ do not perform any secure computation. Therefore, the operation 1 is empty (null) and the operation 2 is not an operation of secure computation but an insertion command to store shares in a specified column, and a specified row of a specified table of the databases 301 to $30n$, respectively.

When a request (command) from the application apparatus 10 is to read data from the database (for example, reading from a designated column and a designated row in the designated table, etc.), the secure computation apparatuses $40_1$ to $40_n$ do not perform secure computation. For this reason, the operation 1 is empty (null) and the operation 2 is a command to read the shares from a specified column and a specified row of a specified table in the databases $30_1$ to $30_n$, etc.

The share generation unit 203 receives data (target data of secret-sharing) from the request analysis unit 201, divides the data to generate n shares 1 to n, and transmits the shares 1 to n to the secure computation apparatus $40_1$ to $40_n$.

The operation instruction unit 204 notifies the secure computation apparatuses $40_1$ to $40_n$ of the operation 2 separated by the operation separation unit 202 via the transmission unit 209. Operation 2 includes an operation (function) executed with secure computation by the secure computation apparatuses $40_1$ to $40_n$.

Alternatively, as described in relation to the operation separation unit 202, the operation 2 notified from the operation instruction unit 204 to the secure computation apparatuses $40_1$ to $40_n$ is not securely computed by the secure computation apparatuses $40_1$ to $40_n$ and an operation of writing the share to the database, or an operation of reading the share.

The reception unit 210 receives k shares 1 to k from at least k secure computation apparatuses 40 among the secure computation apparatuses $40_1$ to $40_n$.

The reconstruction unit 205 reconstructs the data from the k shares 1 to k.

The partial operation processing unit 206 performs the operation 1 which is separated by the operation separation unit 202, on the data (one or a plurality of data) reconstructed by the reconstruction unit 205. The partial operation processing unit 206 transmits the result of the operation through the transmission unit 208 to the application apparatus 10 as a response to the request from the application apparatus 10.

When a part of data extracted by the request analysis unit 201 is used as a partial operation processing in the partial operation processing unit 206, the part of data is transferred to and held by the partial operation processing unit 206, and the operation 1 may be performed using one or a plurality of data reconstructed by the reconstruction unit 205 and the part of the held data.

Part or all of each of the units 201 to 210 of FIG. 3 may be realized by a program executed by a computer constituting the intermediate apparatus 20.

Note that the reception unit 207 and the transmission unit 208 constitute a first communication unit that communicates with the application apparatus 10, and the reception unit 210 and the transmission unit 209 constitute a second communication unit that communicates with the secure computation apparatuses $40_1$ to $40_n$. In the case where the application apparatus 10 and the secure computation apparatuses $40_1$ to $40_n$ are connected to a common network, the first and second communication units may be configured by a common communication unit in which ports may be allocated to each communication unit individually.

<Secure Computation Apparatus>

Figure 4:
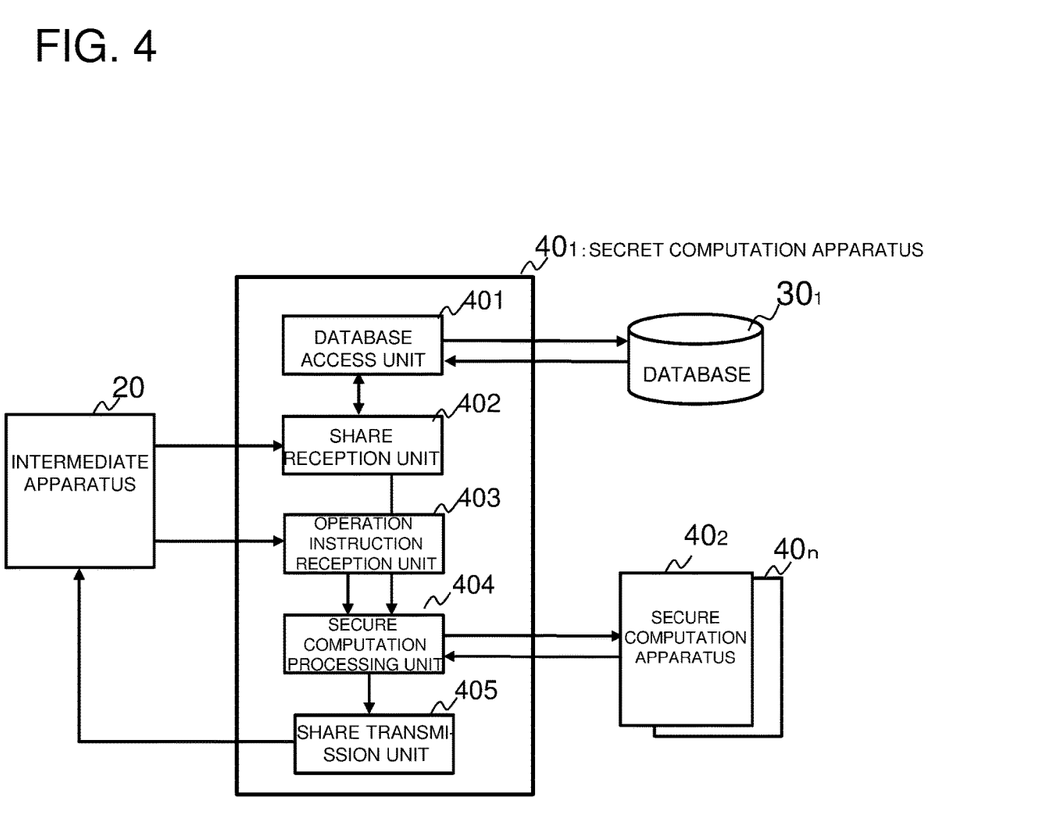
FIG. 4 is a diagram illustrating a secure computation apparatus according to an example embodiment of the present invention.

FIG. 4 is a diagram for illustrating an example of the secure computation apparatuses $40_1$ to $40_n$ in the above-described example embodiment. The secure computation apparatuses $40_1$ to $40_n$ have the same configuration, and the configuration of the secure computation apparatus $40_1$ is schematically illustrated in FIG. 4. The secure computation apparatus $40_1$ includes a database access unit 401 that accesses the database $30_1$ to which the secure computation apparatus $40_1$ is connected, a share reception unit 402 that receives the share 1 secret shared by the intermediate apparatus 20, an operation instruction reception unit 403 that receives an operation instruction from the intermediate apparatus 20 and sets the instruction in a secure computation processing unit 404, the secure computation processing unit 404 that, using a share held in the database 30, a share 1 secret shared by the intermediate apparatus 20, and other secure computation apparatuses $40_2$-$40_n$ and performs a secure computation related to the operation instruction received by the operation instruction reception unit 403, and a share transmission unit 405 that returns the share as the secure computation result to the intermediate apparatus 20. The processing and functions of some or all of the units 401 to 405 of the secure computation apparatus 40 may be realized by a program executed by a computer.

It is noted that the application apparatus 10 may be constituted by a communication terminal or the like, and the intermediate apparatus may be configured as a proxy apparatus. The intermediate apparatus 20 may be virtualized on a server using a server virtualization technology.

It is a matter of course that the secure computation apparatuses $40_1$ to $40_n$ may be mounted on virtual machines on the server.

Several examples will be described in the below. In the following examples, the basic configuration of the system is the same as that illustrated in FIG. 3.

Example Embodiment 1

The application apparatus 10 requests to have a certain data row (data string) arranged in a dictionary order and returned. This request is conveyed to the intermediate apparatus 20.

Each data for generating a data row (a plurality of items of data) requested by the application apparatus 10 undergoes secret sharing to a plurality of shares in the intermediate apparatus 20, for example, and the shares are stored among each of the secure computation apparatuses $40_1$ to $40_n$.

Upon reception of a request from the application apparatus 10, the intermediate apparatus 20 performs a grammar analysis (syntax analysis) of a sentence constituting the request and determines that secret sharing of each data of the data row is processing executed by secure computation, and the alignment in the dictionary order is processing executed by the intermediate apparatus 20.

The intermediate apparatus 20 request the secure computation apparatuses $40_1$ to $40_n$ to perform secure computation of the data row based on the data (secret shared data) stored in the databases $30_1$ to $30_n$ respectively connected to the secure computation apparatuses $40_1$ to $40_n$.

Here, instead of the data row, the secure computation may be performed on a sequence in which the data row is randomly replaced in order.

Each of the secure computation apparatuses $40_1$ to $40_n$ performs secure computation of the data row and sends, to the intermediate apparatus 20, share which is a result of the secure computation.

The intermediate apparatus 20 reconstructs the data row from the shares received from the set of the secure computation apparatuses $40_1$ to $40_n$.

Then, the intermediate apparatus 20 sorts the reconstructed data row in the dictionary order, and generates a data row requested from the application apparatus 10.

The intermediate apparatus 20 sends the data row arranged in the dictionary order to the application apparatus 10.

The secure computation processing by the secure computation apparatuses $40_1$ to $40_n$ to perform arrangement of the secret shared data in the dictionary order requires a large amount of computation.

According to the present embodiment, the processing of aligning the data row in the dictionary order after reconstruction is easy without requiring a large amount of computation.

The amount of data sent from the secure computation apparatuses $40_1$ to $40_n$ to the intermediate apparatus 20 is the same irrespective of not being aligned in or in case of being aligned.

Even if the unaligned data row is released (disclosed) to the intermediate apparatus 20, the amount of information released to the intermediate apparatus 20 is not so large as compared with the case where the data row is aligned before release.

In the case of releasing (disclosing) the data row to the intermediate apparatus 20 after changing the order of the data row at random, the amount of information released to the intermediate apparatus 20 is not so large, and the processing amount of randomly replacing the order is not so large as compared with the processing for aligning the order.

By performing a part of the operation of the request in the intermediate apparatus 20, it is possible to reduce or to suppress an increase the amount of computation, the amount of communication, and the amount of information released to the intermediate apparatus 20.

However, when another column sorted by using a certain data row is requested, since the first data row must additionally be sent to the intermediate apparatus 20, the data amount increases.

Specific Example 1

Regarding a query to a database in SQL (Structured Query Language) language from the application apparatus 10:
 select column-X from table-A order by column-X, "order by" corresponds to "request for alignment" as described above.

In the intermediate apparatus 20, on reception of this query (SQL command) determines that
 the secure computation apparatuses $40_1$ to $40_n$ access the databases $30_1$ to $30_n$, and process "select column-X from table-A"; and
 the intermediate apparatus 20 processes "alignment of the order of column-X" ("order by column-X").

The intermediate apparatus 20 requests only the first half process (select column-X from table-A) to the secure computation apparatuses $40_1$ to $40_n$.

By executing the second half process ("order by column-X") by the intermediate apparatus 20 without having to take the trouble of having the second half process executed by the secure computation apparatuses $40_1$ to $40_n$, the application apparatus 10 can request collectively all processes to the intermediate apparatus 20.

The alignment of the order in the SQL language is applicable not only to the "order by phrase", but also to the "group by phrase" (grouping by data having the same value among values in the same column) and the like. In this case, as well, in some occasions, the order alignment can be left to the intermediate apparatus 20.

Example Embodiment 2

The application apparatus 10 requests resulting data obtained by changing data format of the data. This request is conveyed to the intermediate apparatus 20. It is assumed that the data is secret shared and each share is stored in each of the secure computation apparatuses $40_1$ to $40_n$.

Upon reception of the request, the intermediate apparatus 20 performs syntax analysis of a sentence constituting the request and determines that
 the intermediate apparatus 20 requests the secure computation apparatuses $40_1$ to $40_n$ to take out the data; and
 the intermediate apparatus 20 performs conversion of the data format.

The intermediate apparatus 20 requests the secure computation apparatuses $40_1$ to $40_n$ to return shares of the secret shared stored data.

The set of secure computation apparatuses 40 send the shares of the secret shared stored data to the intermediate apparatus 20.

The intermediate apparatus 20 reconstructs the data from the shares received from the set of secure computation apparatuses 40, changes data format, and generates data requested from the application apparatus 10.

The intermediate apparatus 20 sends the generated data to the application apparatus 10.

Specific Example 2

Regarding a query to a database by the SQL language from the application apparatus 10, for example: select ASCII (column-X) from table-A,
"ASCII ( )" Corresponds to the Request of "Conversion of Data Format".

In this case, the intermediate apparatus 20, on reception of the query (SQL command) determines that:
the secure computation apparatuses $40_1$ to $40_n$ access the databases $30_1$ to $30_n$ and process "select column-X from table-A", and
the intermediate apparatus 20 processes "ASCII (column-X)".

The intermediate apparatus 20 requests the secure computation apparatuses $40_1$ to $40_n$ to perform only the first half process ("select column-X from table-A"), and the latter half process ("ASCII (column-X) can be executed by the intermediate apparatus 20 without taking the trouble to have the latter half process executed by that the secure computation apparatuses $40_1$ to $40_n$. The application apparatus may collectively requests these processes by using one SQL command to the intermediate apparatus 20.

According to the present embodiment, the following operational advantages can be obtained.

Although the process of changing the data format of secret shared data requires a large amount of computation, the process of converting the data format of the reconstructed data is easy.

The amount of data sent from the set of secure computation apparatuses 40 to the intermediate apparatus 20 is often not changed so much before or after the conversion of the data format.

In the case wherein data before conversion of the data format is released (disclosed) to the intermediate apparatus 20, if it is one-to-one conversion, and if the rule is released (disclosed), as compared with release (disclosure) after conversion, the amount of information released to the intermediate apparatus 20 does not change.

According to the present embodiment, the intermediate apparatus 20 is so configured to perform the data format conversion process which is a part of data processing and operation requested from the application apparatus 10, and it is possible to select a computation amount, communication amount, or information amount released to the intermediate apparatus 20 can also be reduced or kept equivalent.

Example Embodiment 3

The application apparatus 10 indicates certain data and requests a result of selecting a row having has a value that matches a value obtained by converting the format of the indicated data from a table (a specified table of the database) secret shared in the secure computation apparatuses $40_1$ to $40_n$. This request is conveyed to the intermediate apparatus 20.

On reception of the request from the application apparatus 10, the intermediate apparatus 20 converts the format of the indicated data and transmits shares which are obtained by secret sharing of the converted value, to the secure computation apparatuses $40_1$ to $40_n$.

The intermediate apparatus 20 requests the secure computation apparatuses $40_1$ to $40_n$ to select the row including the converted value from the table by secure computation and transmit the selected row.

The set of secure computation apparatuses 40 selects a row from the table by secure computation using the shares obtained by secret sharing of the converted data and sends the resulting shares to the intermediate apparatus 20.

The intermediate apparatus 20 reconstructs the data of the table composed of the rows extracted from a plurality of the shares received from the set of the secure computation apparatus 40 and generates the data requested from the application apparatus 10. The intermediate apparatus 20 sends the generated data to the application apparatus 10.

Specific Example 3

Regarding a query to the database by the SQL language from the application apparatus 10:
select * from table-A where ASCII (value)=column-X;
"ASCII ( )" corresponds to the request of "conversion of data format".
This case corresponds to:
the intermediate apparatus 20 which has received the query (SQL command) processes the operation of "V=ASCII (value)", and
the secure computation apparatuses $40_1$ to $40_n$ access the databases $30_1$ to $30_n$, and process "select * from table-A where V=column-X".

The intermediate apparatus 20 requests only the second half process ("select * from table-A where V=column-X") for the secure computation apparatuses $40_1$ to $40_n$, and the first half process (V=ASCII (value) can be executed by the intermediate apparatus 20 without having to take the trouble of having the first half process executed by the set of secure computation apparatuses 40. The application apparatus 10 can request these processes to the intermediate apparatus 20 collectively with a single SQL command all at once.

According to the present embodiment, it is possible to obtain the following operational advantages.

The process of changing the data format of the secret shared data requires a large amount of computation, but the process of converting the data format before secret sharing is easy.

Also, the amount of data sent from the set of secure computation apparatuses 40 to the intermediate apparatus 20 is often not much different, even when the intermediate apparatus 20 performs the conversion of the presented data format.

The process of converting the data format by the intermediate apparatus 20 does not change the amount of information disclosed to the intermediate apparatus 20.

With the intermediate apparatus 20 configured to perform conversion of the first half process of the data processing requested from the application apparatus 10, it is possible to reduce or equalize both the amount of computation, the amount of communication, and the amount of information released to the intermediate apparatus 20.

Example Embodiment 4

The application apparatus 10 requests an average value of elements of a certain data row. This request is conveyed to the intermediate apparatus 20. It is assumed that data that generates the data row is secret shared as a plurality of shares and each share is stored in each of the secure computation apparatuses $40_1$ to $40_n$.

Upon reception of the request, the intermediate apparatus 20 performs syntax analysis of a sentence constituting the request, and determines that     process to calculate a sum of elements of the data row is performed by secure computation, and     process of dividing the sum by the number of the elements of the data row is performed by the intermediate apparatus 20.

The intermediate apparatus 20 requests the secure computation apparatuses $40_1$ to $40_n$ to perform secure computation of a sum of the elements of the data row and the number of elements of the data row.

The secure computation apparatuses $40_1$ to $40_n$ calculate the number of elements of the data row and send the number of elements to the intermediate apparatus 20.

The secure computation apparatuses $40_1$ to $40_n$ perform secure computation of the sum of the data rows and send the shares to the intermediate apparatus 20.

The intermediate apparatus 20 calculates the sum of the elements of the data row from the shares received from the set of secure computation apparatuses 40.

The intermediate apparatus 20 calculates an average value of the data row by dividing the sum by the number of elements of the data row and sends the average value to the application apparatus 10.

Specific Example 4

Regarding a query to the database by the SQL language from the application apparatus 10:

"select AVG (column-X) from table-A",

"AVG (column-X)" corresponds to "average".

In this case, the intermediate apparatus 20, upon reception of the query (SQL command), determines that     the secure computation apparatuses $40_1$ to $40_n$ access the databases $30_1$ to $30_n$, and process     "select SUM (column-X) as S from table-A" (the total value of the specified column X is S), and     "select COUNT (column-X) as N from table-A" (the number of records in the specified column X is N), and     the intermediate apparatus 20 reconstructs S and N from the shares of S and the shares of N respectively sent from the set of secure computation apparatuses 40 and calculates S/N.

The intermediate apparatus 20 can request the secure computation apparatuses $40_1$ to $40_n$ only to process the first half process (select SUM, select COUNT), and without having to take the trouble to have the latter half process (S/N) executed by the secure computation apparatuses $40_1$ to $40_n$. It is possible to request all processing at once.

According to the present embodiment, the following operational advantages can be obtained.

The process of secretly calculating the average value of secret shared data rows requires a large amount of computation, but the process of calculating the sum is easy.

The amount of data sent from the set of secure computation apparatuses 40 to the intermediate apparatus 20 is not significantly different between the sum total and the number of elements, and the average value.

In many cases, the number of data is not a big secret. It is difficult to keep it secret in the database, and in many cases, the number of data itself is not information to be kept hidden.

With the intermediate apparatus 20 configured to execute the average calculation which is a part of the data processing and calculation of the request from the application apparatus 10, both the amount of computation, the amount of communication, and the amount of information released (disclosed) to the intermediate apparatus 20 are reduced, or kept equivalent.

In the above embodiment, the databases $30_1$ to $30_n$ may be configured to store shares obtained by secret sharing of metadata of the database, such as a table name and a column name. In this case, the intermediate apparatus that has received the SQL statement (select column-X from table-A) transmits the secret share of a search character string such as the table name (table-A) to the secure computation apparatuses $40_1$ to $40_n$.

As described above, according to the above example embodiments, data is secret shared and stored in a group of a plurality of apparatuses, and arbitrary processing requested by the application apparatus 10 can be executed, with the data kept concealed in each apparatus. As a result, it is possible to utilize the data while preventing data leakage.

The intermediate apparatus 20 automatically is in charge of handling the process in a request from the application apparatus 10, which will lower the performance of the secure computation, without taking into consideration a performance limit of the secure computation, thereby realizing data utilization by high-speed secure computation with a strong data leakage countermeasure.

The disclosure of each of the above Patent Literature and Non-Patent Literatures is incorporated herein by reference thereto.

Variations and adjustments of the Exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept.

The invention claimed is:

1. A secure computation data utilization system comprising:

an application apparatus on which an application runs;

a plurality of secure computation apparatuses; and an intermediate apparatus that upon reception of a request from the application apparatus, instructs the plurality of secure computation apparatuses to perform operation in accordance with the request,     wherein each of the secure computation apparatuses comprises:

a first processor, and a first memory storing program instructions executable by the first processor, wherein the first processor is configured to execute the program instructions stored in the first memory to transmit, to the intermediate apparatus, a share of a result of processing the operation by secure computation on a share obtained by secrete sharing of data, the operation being instructed from the intermediate apparatus, and     wherein the intermediate apparatus comprises:

a second processor; and a second memory storing program instructions executable by the second processor, wherein the second processor is configured to execute the program instructions stored in the second memory to:

analyze the request received from the application apparatus;

extract an operation to be subjected to secure computation processing by the plurality of secure computation apparatuses from the operation indicated by the request to instruct the extracted operation to the plurality of secure computation apparatuses;

reconstruct data from the plurality of shares transmitted from the plurality of secure computation apparatuses; and separate a part of the operation other than the extracted operation to be subjected to the secure computation processing by the plurality of secure computation apparatuses from the operation indicated by the request from the application apparatus to performs the part of the operation separated from the operation indicated by the request from the application apparatus, on the reconstructed data, or the reconstructed data and at least a part of data included in the request.

2. The secure computation data utilization system according to claim 1, wherein the second processor included in the intermediate apparatus is configured to execute the program instructions stored in the second memory to generate shares of data necessary for secure computation processing by the plurality of secure computation apparatuses to send the shares to the plurality of secure computation apparatuses.

3. The secure computation data utilization system according to claim 1, wherein the plurality of secure computation apparatuses are connected to a plurality of databases that hold shares of secret shared data, wherein the intermediate apparatus receives a database operation command as the request from the application apparatus, and wherein when the plurality of secure computation apparatuses receive at least an operation instruction corresponding to the database operation command from the intermediate apparatus, the first processors included respectively in the plurality of secure computation apparatuses perform secure computation processing corresponding to the operation instruction on the shares held in the plurality of databases.

4. The secure computation data utilization system according to claim 3, wherein the second processor included in the intermediate apparatus is configured to execute the program instructions stored in the second memory to analyze the database operation command, wherein the second processor included is further configured to when the database operation command includes operation processing of at least one or combination of any one or more of:

replacing order;

conversion of data format;

predetermined arithmetic calculation;

ordering; and character string concatenation;

instruct the plurality of secure computation apparatuses to execute one or more operations, except the operation processing, out of the operation of the database operation command, and execute the operation processing.

5. The secure computation data utilization system according to claim 3, wherein the second processor included in the intermediate apparatus is configured to execute the program instructions stored in the second memory to analyze the database operation command and generate shares obtained by secret sharing of at least one of data and metadata of the database to transmit the shares to the plurality of secure computation apparatuses.

6. A secure computation data utilization method comprising:

an intermediate apparatus, upon reception of a request from an application apparatus on which an application runs, analyzing the request from the application, apparatus;

the intermediate apparatus extracting an operation to be subjected to secure computation processing by the plurality of secure computation apparatuses from the operation indicated by the request from the application apparatus;

the intermediate apparatus instructing a plurality of secure computation apparatuses to perform the operation extracted from the operation indicated by the request;

the plurality of the secure computation apparatuses each processing the operation by secure computation on shares obtained by secrete sharing of data, the operation being instructed from the intermediate apparatus to transmit, to the intermediate apparatus, shares of results of processing the operation by secure computation;

the intermediate apparatus reconstructing data from a plurality of the shares received from the plurality of secure computation apparatuses; and the intermediate apparatus separating a part of the operation other than the extracted operation to be subjected to the secure computation processing by the plurality of secure computation apparatuses from the operation indicated by the request from the application apparatus to perform the part of the operation separated from the operation indicated by the request from the application apparatus, on the reconstructed data, or the reconstructed data and at least a part of data included in the request.

7. The secure computation data utilization method according to claim 6, comprising generating, by the intermediate apparatus, shares of data necessary for secure computation processing by the plurality of secure computation apparatuses to send the shares to the plurality of secure computation apparatuses.

8. The secure computation data utilization method according to claim 6, wherein the plurality of secure computation apparatuses are connected to a plurality of databases that hold shares of secret shared data, wherein the intermediate apparatus receives a database operation command as the request from the application apparatus, and wherein the plurality of secure computation apparatuses receive at least an operation instruction corresponding to the database operation command from the intermediate apparatus and perform secure computation processing corresponding to the operation instruction on the shares held in the plurality of databases.

9. The secure computation data utilization method according to claim 8, wherein the intermediate apparatus analyzes the database operation command, wherein when the database operation command includes operation processing of at least one or combination of any one or more of:

replacing order;

conversion of data format;

predetermined arithmetic calculation;

ordering and character string concatenation;

the intermediate apparatus instructs the plurality of secure computation apparatuses to execute one or more operations, except the operation processing, out of the operation of the database operation command, and the intermediate apparatus executes the operation processing.

10. The secure computation data utilization method according to claim 8, wherein the intermediate apparatus analyzes the database operation command and generates shares obtained by secret sharing of at least one of data and metadata of the database to transmits the shares to the plurality of secure computation apparatuses.

11. An intermediate apparatus arranged between an application apparatus on which an application runs, and a plurality of secure computation apparatuses that process operation instructed from the intermediate apparatus by secure computation on shares obtained by secrete sharing of data to transmit, to the intermediate apparatus, shares of results of processing the operation by secure computation, the intermediate apparatus comprising:
 a processor; and a memory storing program instructions executable by the processor, wherein the processor is configured to execute the program instructions stored in the memory to:
 receive a request from the application apparatus to instruct the plurality of secure computation apparatuses to perform operation in accordance with the request;
 analyze the request received from the application apparatus;
 extract an operation to be subjected to secure computation processing by the plurality of secure computation apparatuses from the operation indicated by the request to instruct the extracted operation to the plurality of secure computation apparatuses;
 reconstruct data from the plurality of shares transmitted from the plurality of secure computation apparatuses; and
 separate a part of the operation other than the operation to be subjected to the secure computation processing by the plurality of secure computation apparatuses from the operation indicated by the request from the application apparatus to perform a part of the operation indicated by the request from the application apparatus, on
 the reconstructed data, or
 the reconstructed data and at least a part of data included in the request.

12. The intermediate apparatus according to claim 11, wherein the processor is configured to execute the program instructions stored in the memory to
 generate shares of data necessary for secure computation processing by the plurality of secure computation apparatuses to send the shares to the plurality of secure computation apparatuses.

13. The intermediate apparatus according to claim 11, wherein the plurality of secure computation apparatuses are connected to a plurality of databases that hold shares of secret shared data,
 wherein the intermediate apparatus receives a database operation command as the request from the application apparatus, and
 wherein the plurality of secure computation apparatuses receive at least an operation instruction corresponding to the database operation command from the intermediate apparatus and perform secure computation processing corresponding to the operation instruction on the shares held in the plurality of databases.

14. The intermediate apparatus according to claim 13, wherein the processor is configured to execute the program instructions stored in the memory to:
 analyze the database operation command, and
 when the database operation command includes operation processing of at least one or combination of any one or more of:
 replacing order;
 conversion of data format;
 predetermined arithmetic calculation;
 ordering; and
 character string concatenation;
 instruct the plurality of secure computation apparatuses to execute one or more operations, except the operation processing, out of the operation of the database operation command, and the intermediate apparatus executes the operation processing.

15. The intermediate apparatus according to claim 13, wherein the processor is configured to execute the program instructions stored in the memory to
 analyze the database operation command and generates shares obtained by secret sharing of at least one of data and metadata of the database to transmits the shares to the plurality of secure computation apparatuses.

16. A non-transitory computer readable recording medium storing therein a program causing a computer constituting an intermediate apparatus arranged between an application apparatus on which an application runs, and a plurality of secure computation apparatuses that process operation instructed from the intermediate apparatus by secure computation on shares obtained by secrete sharing of data to transmit, to the intermediate apparatus, shares of results of processing the operation by secure computation, to execute processing comprising:
 receiving a request from the application apparatus to instruct the plurality of secure computation apparatuses to perform operation in accordance with the request;
 analyzing the request from the application apparatus;
 extracting an operation to be subjected to secure computation processing by the plurality of secure computation apparatuses from the operation indicated by the request from the application apparatus;
 instructing the extracted operation to the plurality of secure computation apparatuses;
 reconstructing data from the plurality of shares transmitted from the plurality of secure computation apparatuses; and
 separating a part of the operation other than the extracted operation to be subjected to the secure computation processing by the plurality of secure computation apparatuses from the operation indicated by the request from the application apparatus to perform the part of the operation separated from the operation indicated by the request from the application apparatus, on
 the reconstructed data, or
 the reconstructed data and at least a part of data included in the request.

17. The non-transitory computer readable recording medium according to claim 16, wherein the program causes the computer to execute processing comprising:
 generating shares of data necessary for secure computation processing by the plurality of secure computation apparatuses to send the shares to the plurality of secure computation apparatuses.

18. The non-transitory computer readable recording medium according to claim 17, wherein the medium stores the program to cause the computer to execute processing comprising:

analyzing the database operation command;
generating shares obtained by secret sharing of at least one of data and metadata of the database; and
transmitting the shares to the plurality of secure computation apparatuses.

* * * * *

UNITED STATES PATENT AND TRADEMARK OFFICE
CERTIFICATE OF CORRECTION

PATENT NO. : 10,721,063 B2
APPLICATION NO. : 15/571880
DATED : July 21, 2020
INVENTOR(S) : Jun Furukawa et al.

It is certified that error appears in the above-identified patent and that said Letters Patent is hereby corrected as shown below:

In the Specification

Column 2, Background, Line 27; Delete "$F(x)=a_0+a_1 \cdot x+a_2 \cdot x^{\wedge}(k-1)$" and insert --$F(x) = a_0 + a_1 \cdot x + a_2 \cdot x \,\hat{}\, 2 + \ldots + a_{k-1} \cdot x \,\hat{}\, (k-1)$-- therefor Column 4, Summary, Line 25; After "the", insert --request.--

Column 7, Detailed Description, Line 25; Delete "$40_1$ to $40_1$" and insert --$40_1$ to $40_n$-- therefor Column 11, Detailed Description, Line 42; Delete "40," and insert --$40_1$-- therefor Column 12, Detailed Description, Line 36; After "$40_1$ to $40_n$", insert --,--

Column 13, Detailed Description, Line 27; After "apparatus", insert --10--

Column 16, Detailed Description, Line 27; After "thereto.", delete "¶"

In the Claims

Column 18, Line 5; In Claim 6, delete "application," and insert --application-- therefor Column 18, Line 64; In Claim 9, after "ordering", insert --;--

Signed and Sealed this
Seventeenth Day of November, 2020

Andrei Iancu
*Director of the United States Patent and Trademark Office*